(12) United States Patent
Watt

(10) Patent No.: US 7,490,168 B2
(45) Date of Patent: Feb. 10, 2009

(54) SERVICE ORIENTED INTEGRATION SERVER ARCHITECTURE

(75) Inventor: Stephen James Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 10/738,713

(22) Filed: Dec. 17, 2003

(65) Prior Publication Data

US 2005/0138208 A1 Jun. 23, 2005

(51) Int. Cl.
*G06F 15/16* (2006.01)
*G06F 15/173* (2006.01)
*G06F 9/14* (2006.01)
*G06F 7/04* (2006.01)

(52) U.S. Cl. .................. 709/246; 709/226; 709/203; 726/4; 717/117

(58) Field of Classification Search .............. None
See application file for complete search history.

(56) References Cited

U.S. PATENT DOCUMENTS

| | | | | |
|---|---|---|---|---|
| 5,247,661 | A | 9/1993 | Hager et al. ............ | 395/600 |
| 5,276,869 | A | 1/1994 | Forrest et al. ............ | 395/600 |
| 5,893,106 | A | 4/1999 | Brobst et al. ............ | 707/102 |
| 6,442,620 | B1 | 8/2002 | Thatte et al. ............ | 709/316 |
| 6,487,599 | B1 | 11/2002 | Smith et al. ............ | 709/229 |
| 6,487,607 | B1 | 11/2002 | Wollrath et al. ............ | 709/330 |
| 6,523,042 | B2 * | 2/2003 | Milleker et al. ............ | 707/102 |
| 2002/0097150 | A1 * | 7/2002 | Sandelman et al. ........ | 340/506 |
| 2002/0120685 | A1 * | 8/2002 | Srivastava et al. .......... | 709/203 |
| 2003/0167223 | A1 * | 9/2003 | Pledereder et al. ............ | 705/37 |
| 2005/0005167 | A1 * | 1/2005 | Kelly et al. ................. | 713/201 |
| 2006/0265689 | A1 * | 11/2006 | Kuznetsov et al. .......... | 717/117 |
| 2007/0121850 | A1 * | 5/2007 | Klos et al. ............. | 379/114.28 |

OTHER PUBLICATIONS

Living in an On Demand World, Oct. 2002, International Business Machines Corporation.
Respond on Demand to Changing Business Needs, 2003, International Business Machines Corporation.
IBM Global Services help customers uncover hidden value, Nov. 5, 2003, International Business Machines Corporation.
The on deman era: Q&A with Ginni Rometty, Oct. 2002, International Business Machines Corporation.

* cited by examiner

*Primary Examiner*—Wen-Tai Lin
(74) *Attorney, Agent, or Firm*—Duke W. Yee; David A. Mims, Jr.; Rudolf O. Siegesmund

(57) ABSTRACT

An integration server architecture (ISA) that facilitates communication between processes that do not share a common message format or use a common communication protocol. The ISA comprises a combination of adapters and a Queuing and Translation Engine (QTE). Every process that uses the ISA must have an adapter designed to understand that process's native message format. The adapter forwards the message to the QTE. The QTE places the forwarded message in an incoming message queue (IMQ). The QTE then retrieves messages from the IMQ in the order they arrive, identifies the sender, and locates an entry for the sender in a Configuration Database (CDB). The CDB entry designates a translation map that enables the QTE to properly translate messages into the receiving process's native format. The QTE uses the map to translate the messages into the receiving process's native format, and then forwards the translated message to the appropriate adapter.

1 Claim, 4 Drawing Sheets

FIG. 4

```
<?xml version="1.0"?>
<Partners>
    <Partner>
        <Controller-Properties>
            <IDTag>Source</IDTag>
            <IDValue>Partner-A</IDValue>
        </Controller-Properties>
        <QTE-Properties>
            <Target>http://localhost:9080/Outgoing</Target>
            <XSL>c:\\configuration\\Partner-B_Mapping.xsl</XSL>
            <FailureQueue>Partner-A_Failure</FailureQueue>
        </QTE-Properties>
    </Partner>
    <Partner>
        <Controller-Properties>
            <IDTag>Source</IDTag>
            <IDValue>Partner-B</IDValue>
        </Controller-Properties>
        <QTE-Properties>
            <Target>http://localhost:9080/Outgoing</Target>
            <XSL>c:\\configuration\\Partner-A_Mapping.xsl</XSL>
            <FailureQueue>Partner-B_Failure</FailureQueue>
        </QTE-Properties>
    </Partner>
```

FIG. 6

```
<?xml version="1.0" encoding="ISO-8859-1" ?>
-<TICKET>
    <HEADER>Header Data Goes Here!</HEADER>
    -<BODY>
        <PROBLEM>File Access</PROBLEM>
        <DESCRIPTION>I can't open my file.</DESCRIPTION>
        <NOTE>I have a deadline - this is urgent. Thanks.</NOTE>
    </BODY>
</TICKET>
```

FIG. 7

```
<?xml version="1.0" encoding="ISO-8859-1" ?>
-<ENVELOPE>
    <HEADER>Header Data Goes Here!</HEADER>
    -<DATA>
        <ISSUE>File Access</ISSUE>
        <INFORMATION>I can't open my file.</INFORMATION>
        <TEXT>I have a deadline - this is urgent. Thanks.</TEXT>
    </DATA>
</ENVELOPE>
```

```xml
<?xml version="1.0" encoding="UTF-8" ?>
-<xsl:stylesheet xmlns:xsl="http://www.w3.org/1999/XSL/Transform" version="1.0"
    xmlns:xalan="http://xml.apache.org/xsit">
    <xsl:output method="xml" encoding="UTF-8" indent="yes" xalan:indent-amount="2" />
    <xsl:strip-space element="*" />
    <!-- ================================================ -->
    <!-- This file contains an XSLT transformation stylesheet which     -->
    <!-- constructs a result tree from a number of XML sources by filtering -->
    <!-- reordering and adding arbitrary structure. This file is        -->
    <!-- automatically generated by the XML Mapper tool from IBM WebSphere -->
    <!-- Studio Workbench.                                              -->
    <!-- ================================================ -->
    <!-- ================================================ -->
    <!--                    The Root Element                            -->
    <!-- The "Root Element" section specifies which template will be    -->
    <!-- invoked first thus determining the root element of the result tree. -->
    <!-- ================================================ -->
    -<xsl:template match="/">
        <xsl:call-template name="Envelope" />
    </xsl:template>
    <!-- ================================================ -->
    <!--                    Remaining Templates                         -->
    <!-- The remaining section defines the template rules. The last Template -->
    <!-- rule is a generic identity transformation used for moving complete -->
    <!-- tree fragments from an input source to the result tree.        -->
    <!-- ================================================ -->
```

*FIG. 5A*

```xml
<!-- Newly-defined element template -->
<xsl:template name="Data">
  <Data>
    <Issue>
      <xsl:value-of select="/Ticket/Body/Problem/text()" />
    </Issue>
    <Information>
      <xsl:value-of select="/Ticket/Body/Description/text()" />
    </Information>
    <Text>
      <xsl:value-of select="/Ticket/Body/Note/text()" />
    </Text>
  </Data>
</xsl:template>
<!-- Newly-defined element template -->
<xsl:template name="Header">
  <Header>
    <Source>
      <xsl:value-of select="/Ticket/Header/Source/text()" />
    </Source>
  </Header>
</xsl:template>
<!-- Newly-defined element template -->
<xsl:template name="Envelope">
  <Envelope>
    <xsl:call-template name="Header" />
    <xsl:call-template name="Data" />
  </Envelope>
</xsl:template>
<!-- Identity transformation template -->
<xsl:template match="*|@*|comment()|processing-instruction()|text()">
  <xsl:copy>
    <xsl:apply-templates select="*|@*|comment()|processing-instruction()|text()" />
  </xsl:copy>
</xsl:template>
</xsl:stylesheet>
```

*FIG. 5B*

SERVICE ORIENTED INTEGRATION SERVER ARCHITECTURE

FIELD OF THE INVENTION

The invention relates to the field of computer networks. In particular, the invention relates to an apparatus and method for integrating communications and services between organizations operating over a variety of network, transportation, and message protocols.

BACKGROUND OF THE INVENTION

Over the past decade, a changing macroeconomic landscape has had a profound effect on how companies operate and compete. Simultaneously, a changing technology landscape has fundamentally changed the way companies can manage their core business processes.

Traditionally, companies have held managers accountable for the performance of each manager's respective business unit. Accountability has in turn driven managers to develop business processes and information technology (IT) infrastructure designed to boost the performance of their isolated units. In the early years of the IT evolution, advances in computer technology paved the way for managers to implement unprecedented levels of process automation. Process automation generally improved the performance of each isolated unit. In turn, the improved performance of each isolated unit generally translated into company-wide performance improvements.

However, companies continued to be challenged by an increasingly fast and complex environment. Customers continued to demand more from companies. Customers wanted more customization of products and services, and wanted products and services delivered faster, and when and where they chose. Moreover, customers were not alone in demanding more from companies. Suppliers and strategic partners also wanted tighter integration with companies' core processes, so that they could deliver faster and better with lower levels of working capital.

By the mid-1990s, companies began to realize that they must find a way to integrate their business processes end-to-end across the enterprise and with key partners, suppliers, and customers. Companies quickly recognized that they could use network technology to increase their understanding of how business processes related to each other. Companies also recognized that they could use the same network technology to improve the way business processes interacted with one another. Thus, companies turned to network technology to provide a mechanism for managing their processes horizontally to improve performance throughout the enterprise, instead of in discrete organizational units. Network technology also allowed companies to open their processes to the outside world. Customers, suppliers, and strategic partners could now integrate their own processes with those of the company.

The key to successful process integration is process communication. Processes frequently communicate with each other through messages sent over networks or internal circuits. Thus, the key to process communication is using message formats and communication protocols that other processes understand. Unfortunately, forty years of technology evolution have left most companies with a computing infrastructure that is heterogeneous, widely distributed, and increasingly complex. Single enterprises commonly operate multiple business processes through disconnected applications, middleware, servers, and operating systems. Many companies, and even many internal business units, use their own proprietary message formats and communication protocols that external processes cannot understand. Making such diverse processes and systems communicate effectively can be costly and complicated for most companies.

Companies have generally taken one of two approaches to the task of making processes communicate effectively. One approach is to "teach" processes to speak the same language and use the same protocols. In the IT context, this means re-programming processes so that all processes use a common message format and communication protocol. The other approach is to develop interpretation processes that can translate diverse message formats for other processes.

Integration servers generally attempt to implement both approaches with one comprehensive suite of tools. An integration server provides tools that allow a company to redesign processes rapidly, using standardized protocols and formats to increase process interoperability. An integration server also provides a company with tools to create an interpretation system, so that existing company processes can communicate more efficiently with each other and with external processes. Integration servers, though, are often quite complex, time consuming, and expensive. Many small and medium size companies simply do not need and/or cannot afford the level of functionality that these complex integration servers provide. Therefore, a need still exists for a method of facilitating inter-process communication that is tailored to the needs of small and medium size companies.

SUMMARY OF THE INVENTION

The present invention comprises an integration server architecture (ISA) that facilitates communication between processes that do not share a common message format or use a common communication protocol. Each communication between processes takes the form of a message sent from one process to another through the ISA.

The ISA comprises a combination of adapters and a Queuing and Translation Engine (QTE). Every process that uses the ISA must have an adapter designed to understand that process's native message format and communication protocol. In the preferred embodiment, each adapter comprises a pair of gateways. One gateway must handle messages sent to the ISA (i.e. an incoming gateway); the other must be able to handle messages sent by the ISA (i.e. an outgoing gateway). In the preferred embodiment, each process that uses the ISA must connect to the QTE through the appropriate adapter. The QTE comprises an incoming message queue (IMQ), a message translation module (MTM), and a configuration database (CDB). When a process sends a message to an appropriate ISA adapter, the message is routed to the adapter's incoming message gateway (IMG) and the IMG forwards the message to the QTE. The IMG then uses the sending process's native message format and communication protocol to notify the sender that the QTE received (or rejected) the forwarded message. The QTE places the forwarded message in the IMQ. When the MTM detects the new message in the IMQ, the MTM locates an entry for the sending process in the CDB. The sending process's entry in the CDB identifies an appropriate translation map for the receiving process that enables the MTM to translate the message into the receiving process's native format. The MTM then forwards the translated message to the appropriate outgoing message gateway

BRIEF DESCRIPTION OF DRAWINGS

FIG. 4 is an XML example of a gateway profile;

FIGS. 5A AND 5B is an XSL example of a translation map file;

FIG. 6 is an XML example of an original message sent from one process to another;

FIG. 7 is an XML example of a transformed message; and

DETAILED DESCRIPTION OF THE PREFERRED EMBODIMENT

The foregoing and other objects, features, and advantages of the invention will be apparent from the following more particular description of the preferred embodiment of the invention, as illustrated in the accompanying drawings wherein like reference numbers represent like parts of the invention.

As used herein, the term "communication channel" means any pathway over which data is, or may be, transferred between processes, including without limitation any physical or electromagnetic medium, such as a telephone line, optical fiber, coaxial cable or twisted pair wire, or radio wave.

The term "communication protocol" means any standard or set of rules designed to allow computers to exchange information over a communication channel, including without limitation TCP/IP, HTTP, FTP, and SMTP.

The term "configuration database" means any repository or collection of gateway profiles.

The term "database" means any collection of data stored together and organized for rapid search and retrieval, including without limitation flat file databases, fielded databases, full-text databases, object-oriented databases, and relational databases.

The term "gateway profile" refers to a generic set of attributes for any given gateway that describe the gateway and enable the QTE to determine the appropriate translation map to apply to a message sent to through that gateway to a destination designated by a sending process.

The term "native format" means the file or message format that an application or process normally reads and writes.

The term "process" includes any set of instructions or code running on any processing apparatus, including without limitation a computer system.

The term "translation map" means any file, database, or other data source that enables the QTE to convert one message format to another message format.

The present invention can be implemented in many different configurations, including software, hardware, or any combination thereof. The ISA itself may be considered a process, but it operates in conjunction with other distinct external processes. For the sake of clarity and simplicity, the discussion presented below discusses the operation of the invention in conjunction with only two distinct external processes. A person of ordinary skill in the art, though, will appreciate that the present invention may be applied to an almost limitless number of distinct external processes.

Figure 1:
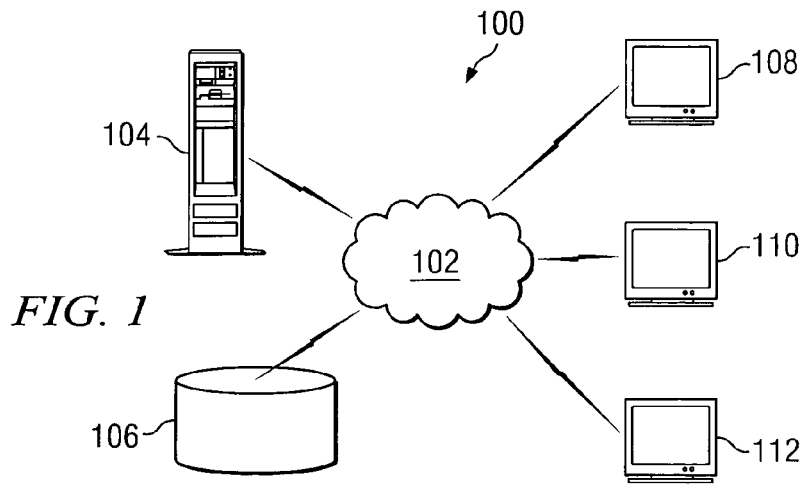
FIG. 1 is a depiction of a typical networked computing environment in which the integrated server architecture could be implemented.

FIG. 1 is an illustration of computer network 100 associated with the present invention. Computer network 100 comprises local workstation 108 electrically coupled to network connection 102. Local workstation 108 is electrically coupled to remote workstation 110 and remote workstation 112 via network connection 102. Local workstation 108 is also electrically coupled to server 104 and persistent storage 106 via network connection 102. Network connection 102 may be a simplified local area network (LAN) or may be a larger network such as a wide area network (WAN) or the Internet. Furthermore, computer network 100 depicted in FIG. 1 is intended as a representation of a possible operating network that may contain the present invention and is not meant as an architectural limitation.

Figure 2:
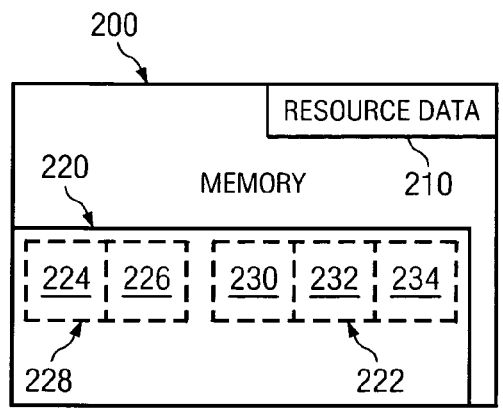
FIG. 2 represents the memory configuration of a typical computing workstation using the integrated server architecture.

The internal configuration of a computer, including connection and orientation of the processor, memory, and input/output devices, is well known in the art. The present invention is a methodology that can be embodied in a computer program. Referring to FIG. 2, the methodology of the present invention is implemented in ISA 220, which resides in memory 200. ISA 220 comprises QTE 222 and at least one adapter 228 consisting of a pair of gateways, such as IMG 224 and OMG 226. QTE 222 comprises IMQ 230, MTM 232, and CDB 234. ISA 220, including QTE 222, IMG 224, and OMG 226 described herein can be stored within memory 200 of any workstation or server depicted in FIG. 2. Alternatively, ISA 220, including QTE 222, IMG 224, and OMG 226 can be stored in an external storage device such as persistent storage 106, or a removable disk such as a CD-ROM (not pictured). Memory 200 is only illustrative of memory within one of the machines depicted in FIG. 2 and is not meant as a limitation. Memory 200 also contains resource data 210, which includes stack data 212. The present invention may interface with resource data 210 through memory 200.

In alternative embodiments, QTE 222 and/or any of the gateways can be stored in the memory of other computers. Storing QTE 222 and/or gateways in the memory of other computers allows the processor workload to be distributed across a plurality of processors instead of a single processor. Further configurations of ISA 220 across various multiple memories and processors are known by persons skilled in the art.

Figure 3:
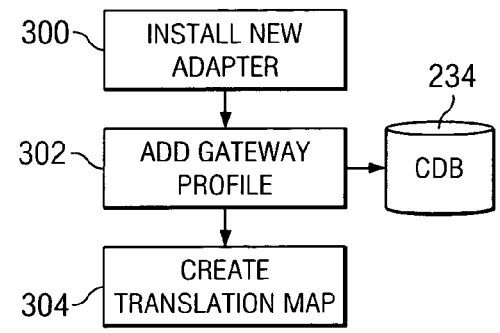
FIG. 3 illustrates the procedure required for extending the functionality of the integrated server architecture to serve new external processes.

The present invention provides a flexible and modular architecture. ISA 220 requires a one-time setup that requires installing QTE 222. After QTE 222 is properly installed, ISA 220 functionality may be extended to service external processes. FIG. 3 illustrates the procedure for adding external processes. As shown in FIG. 3, ISA 220 may be extended simply by creating an adapter for the external process (300), adding a gateway profile (302) to CDB 234, and creating the necessary translation mapping (304) between the new external process and an external process that has already been configured using this procedure.

FIG. 4 provides an example of what two gateway profiles in CDB 234 might look like. In FIG. 4, a gateway profile is described using extensible markup language (XML). XML is a standardized markup language well known to a person of ordinary skill in the art, and the syntax of XML need not be described in detail here. FIG. 4 includes entries for two external processes. In FIG. 4, each gateway profile begins with a "<Partner>" label and ends with a corresponding "</Partner>" label. A profile comprises a collection of attributes that describe the gateway. Each gateway profile is given a name within the "Controller-Properties" block. In this example, there are two entries: one for "Partner-A" and one for "Partner-B." The "QTE-Properties" specify a target uniform resource locator (URL) and a translation map file (TMAP).

FIGS. 5A AND 5B provides an example TMAP in XSL. XSL is also a standardized language well known to a person of ordinary skill in the art and need not be explained in greater detail here. This example might be used in a typical Help Desk scenario where one organization relies on another organization for resolving technical support issues. For purposes of this illustration, the original Help Desk request message might consist of data described in an XML format such as depicted in FIG. 6. As seen in FIG. 6, the original request might comprise a "TICKET" having a "HEADER" and a message "BODY." The "BODY" would further comprise a "PROBLEM" element, a "DESCRIPTION," and additional "NOTE" section. An XSL TMAP would translate this original Help Desk request message into a format understood by the Help Desk process. Using the TMAP depicted in FIGS. 5A AND 5B for illustration purposes, the "TICKET" would be transformed into an "ENVELOPE" having a "HEADER" and message "DATA." Similarly, the "PROBLEM" would be changed to an "ISSUE," the "DESCRIPTION" to "INFORMATION," and the "NOTE" to "TEXT." In this example, the example in FIG. 6 would be transformed into the message (also in XML) illustrated in FIG. 7.

As described in detail below, MTM 232 searches CDB 234 to locate a gateway profile that matches both the sender of a message and the target URL to determine which translation map file to use. Each gateway profile may also designate a failure queue, as in this example. If a failure queue is designated, ISA 220 reports all errors to the designated location. It should be noted that a single gateway might have multiple profiles designating different target URLs and translation map files. For instance, Partner-A could have a second entry specifying a different target URL for "Partner-C." The translation map file may or may not be the same as the map file used for Partner-B. FIG. 4 is provided for illustration purposes only and is not intended to limit the scope of the present invention. A person of ordinary skill in the art will appreciate the various languages and profile information that a gateway profile could contain.

Figure 8:
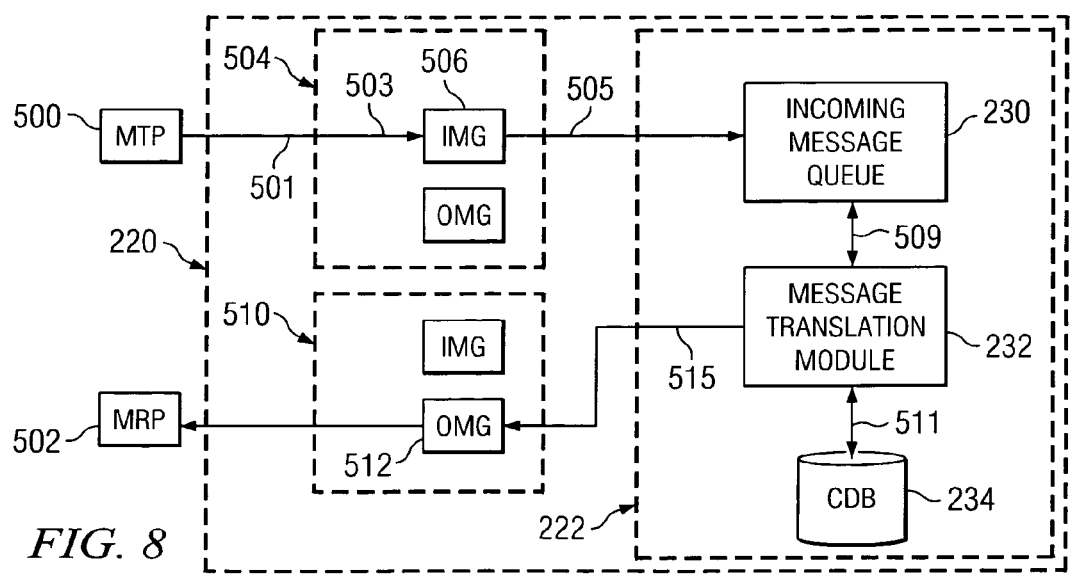
FIG. 8 illustrates the operation of the integrated server architecture and its interaction with two external processes, in particular the flow of information as a message is sent from one process to another.

FIG. 8 illustrates the operation of ISA 220 and its interaction with two external processes. Message transmitting process (MTP) 500 initiates a communication with message receiving process (MRP) 502 by sending a message to adapter-A 504 (501) using MTP 500 native format. The message must contain a target URL or other information identifying a destination for the message. Adapter-A 504 is designed to listen on a specific communication channel for messages originating from MTP 500. When adapter-A 504 detects a message from MTP 500, adapter-A 504 routes the message through IMG 506 (503). IMG 506 then places the message in IMQ 230 (505), along with the identification of IMG 506, and sends a response to MTP 500 in MTP 500 native format, indicating success or failure. In one embodiment of the present invention, IMG 506 notifies MTM 232 that a new message has been put in IMQ 230. In another embodiment, IMQ 230 notifies MTM 232 that it has received a new message. In yet another embodiment, MTM 232 detects a new message in IMQ 230 (509). MTM 232 next searches CDB 234 for a gateway profile associated with IMG 506 (511) that has a matching target URL attribute. When a match is found, MTM 232 loads the appropriate translation map file and translates the message into MRP 502 native format. MTM 232 then forwards the translated message to adapter-B 510 (515). Adapter-B 510 is designed to forward messages on a communication channel that MRP 502 expects messages, using a communication protocol that MRP 502 understands. When adapter-B 510 receives the message from MTM 232, adapter-B 510 routes the message to OMG 512. OMG 512 then posts the message at the target URL designated in the message and notifies MRP 502 of the delivery. Alternatively, OMG 512 could post the message without notification, and MRP 502 would periodically check for new messages. If desired or needed, MRP 502 could send a response or receipt to MTP 500 by reversing the procedure just described.

It will be understood from the foregoing that various modifications and changes may be made in the preferred embodiment of the present invention by those skilled in the art without departing from its true spirit. It is intended that this description be for illustrative purposes only and should not be construed in a limiting sense. The scope of the invention should be limited only by the language of the following claims.

What is claimed is:

1. A method of translating messages sent on a communication channel from a sending process to a receiving process where the sending process and the receiving process do not share a common message format or use a common communication protocol and where each communication between the sending process and the receiving process takes the form of a message sent through an integration service architecture, comprising:

providing the integration service architecture with a plurality of adapters and a queuing and translation engine;

providing the queuing and translation engine with an incoming message queue, a message translation module, and a configuration database;

wherein the configuration database stores a plurality of gateway profiles;

wherein each gateway profile is described using extensible markup language and comprises:
 a target uniform resource locator (URL);
 a designation of a translation map; and
 a designation of a failure queue to which all errors are reported;

wherein the translation map is an extensible style language file;

for each process sending a plurality of messages through the integration server architecture, providing an adapter designed to understand a native message format of the process and a communication protocol for the process;

for each adapter provided, providing an incoming message gateway and an outgoing message gateway;

connecting each process that uses the integration server architecture to the queuing and translation engine through an appropriate adapter;

when a process sends a message to the appropriate adapter, the message is routed to the appropriate adapter's incoming message gateway and to the queuing and translation engine which places the message in the incoming message queue;

when the message translation module detects the forwarded message in the incoming message queue, the message translation module searches the configuration database to locate a gateway profile that matches both the sending process and target URL;

identifying an appropriate translation map for the receiving process using the located gateway profile that enables the message translation module to translate the message into a native format of the receiving process; and forwarding, by the message translation module, the translated message to the appropriate outgoing message gateway, wherein the appropriate outgoing message gateway uses the receiving process's native protocol to transmit the translated message to the receiving process.

* * * * *